United States Patent
Hoshino et al.

(10) Patent No.: US 8,517,880 B2
(45) Date of Patent: Aug. 27, 2013

(54) COMPRESSOR WITH TRANSMISSION

(75) Inventors: Nobuaki Hoshino, Aichi-ken (JP); Masaki Ota, Aichi-ken (JP); Masahiro Kawaguchi, Aichi-ken (JP); Yoshio Kimoto, Aichi-ken (JP); Toru Onishi, Aichi-ken (JP)

(73) Assignee: Kabushiki Kaisha Toyota Jidoshokki, Aichi-Ken (JP)

( * ) Notice: Subject to any disclaimer, the term of this patent is extended or adjusted under 35 U.S.C. 154(b) by 331 days.

(21) Appl. No.: 13/049,107

(22) Filed: Mar. 16, 2011

(65) Prior Publication Data
US 2011/0245004 A1    Oct. 6, 2011

(30) Foreign Application Priority Data

Mar. 31, 2010   (JP) .................................. 2010-080367

(51) Int. Cl.
*F16H 13/06* (2006.01)
(52) U.S. Cl.
USPC .......................................... 475/183; 475/346
(58) Field of Classification Search
USPC .............. 62/508, 498; 180/53.8; 475/5, 149, 475/150, 183, 317, 318, 320, 331, 346, 347
See application file for complete search history.

(56) References Cited

U.S. PATENT DOCUMENTS

| 4,158,972 A * | 6/1979 | Chamberlain | 475/337 |
| 5,931,759 A * | 8/1999 | Otaki et al. | 475/195 |
| 8,303,459 B2 * | 11/2012 | Kawai | 475/320 |
| 2004/0146419 A1 * | 7/2004 | Kawaguchi et al. | 418/55.1 |
| 2006/0019786 A1 * | 1/2006 | Asa et al. | 475/5 |
| 2006/0107681 A1 * | 5/2006 | Uno et al. | 62/323.1 |
| 2010/0227725 A1 * | 9/2010 | Inayoshi | 475/183 |

FOREIGN PATENT DOCUMENTS

| JP | 2002-235823 | 8/2002 |
| JP | 2007-107412 | 4/2007 |

OTHER PUBLICATIONS

U.S. Appl. No. 13/071,684 to Yoshio Kimoto et al., which was filed Mar. 25, 2011.

* cited by examiner

*Primary Examiner* — Justin Holmes
*Assistant Examiner* — Huan Le
(74) *Attorney, Agent, or Firm* — Greenblum & Bernstein P.L.C.

(57) ABSTRACT

A compressor includes a housing, a compression mechanism, an input shaft rotatable on an axis thereof, an output shaft for driving the compression mechanism, a transmission for transmitting torque from the input shaft to the output shaft and changing the speed of the input shaft and a control device. The transmission is a planetary roller train and includes a plurality of planetary rollers, a carrier, a sun roller and a ring roller. The ring roller includes a first ring engaging the respective planetary rollers and a second ring supporting a one-way clutch. The ring roller can be movable relative to the housing in the direction parallel to the axis. The first ring and the second ring are connected so that the first ring can be displaced in a radial direction, integrally rotatable with the second ring and movable with the second ring in the direction parallel to the axis.

8 Claims, 4 Drawing Sheets

COMPRESSOR WITH TRANSMISSION

BACKGROUND OF THE INVENTION

The present invention relates to a compressor with a transmission.

Japanese Patent Application Publication 2007-107412 discloses a compressor including a housing, a compression mechanism formed in the housing and operable to compress refrigerant, an input shaft extending into the housing from outside and rotatably supported, an output shaft extending in the housing and rotatably supported for driving the compression mechanism, a transmission provided in the housing between the input shaft and the output shaft for transmitting torque from the input shaft to the output shaft and also changing the rotating speed of the output shaft for driving the compression mechanism by increasing or decreasing the rotating speed of the input shaft, and a control device for controlling the operation of the transmission.

The transmission includes a first planetary gear train and a second planetary gear train provided in the front (on the input shaft side) and in the rear (on the output shaft side) in the axial direction thereof, respectively. Each of the first and the second planetary gear trains include a sun gear, a plurality of planetary gears, a carrier retaining respective rotatable planetary gears and a ring gear engaged with respective planetary gears. A thrust bearing and a radial bearing are provided between the respective ring gears and the housing. The ring gear is selectively fixed to or rotatable relative to the housing.

The control device includes a first one-way clutch provided between the ring gear of the first planetary gear train and the housing, a first clutch provided between the ring gear of the first planetary gear train and the carrier, a second one-way clutch provided between the ring gear of the second planetary gear train and the carrier, and a second clutch provided between the ring gear of the second planetary gear train and the housing. The first and the second clutches are operable to engage the respective ring gears selectively with the carrier or with the housing by being displaced in longitudinal direction of the compressor.

The first and the second clutches of the above compressor selectively engage or disengage the respective ring gears independently or simultaneously thereby to allow or prevent the rotation of the respective ring gears relative to the housing or the carrier. Thus, the transmission can change the gear ratio and drive the compression mechanism, accordingly.

However, the structure of the above-described compressor is complicated and, therefore, there has been problems of high manufacturing cost and large noise development due to vibration.

The present invention is directed to providing a compressor with a transmission that can be manufactured at low cost and accomplishes noise reduction.

SUMMARY OF THE INVENTION

A compressor includes a housing, a compression mechanism, an input shaft rotatable on an axis thereof, an output shaft for driving the compression mechanism, a transmission for transmitting torque from the input shaft to the output shaft and also changing the rotating speed of the input shaft and a control device. The transmission includes a plurality of planetary rollers, a carrier rotatably supporting the respective planetary rollers and being integrally rotatable with the input shaft, a sun roller engaged with the respective planetary rollers and integrally rotatable with the output shaft and a ring roller engaged with the respective planetary rollers. The ring roller can be fixed to the housing or rotatable relative to the housing. The control device includes a one-way clutch allowing the ring roller to rotate only one direction relative to the carrier and a clutch fixing the ring roller to the housing or allowing the ring roller to rotate relative to the housing. The ring roller includes a first ring engaged with the respective planetary rollers and a second ring supporting the one-way clutch. The ring roller can be movable relative to the housing in the direction parallel to the axis. The first ring and the second ring are connected so that the first ring can be displaced in a radial direction, integrally rotatable with the second ring and movable with the second ring in the direction parallel to the axis.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

The following will describe the compressor with the transmission according to the first and the second embodiments with reference to the accompanying drawings.

Figure 1:
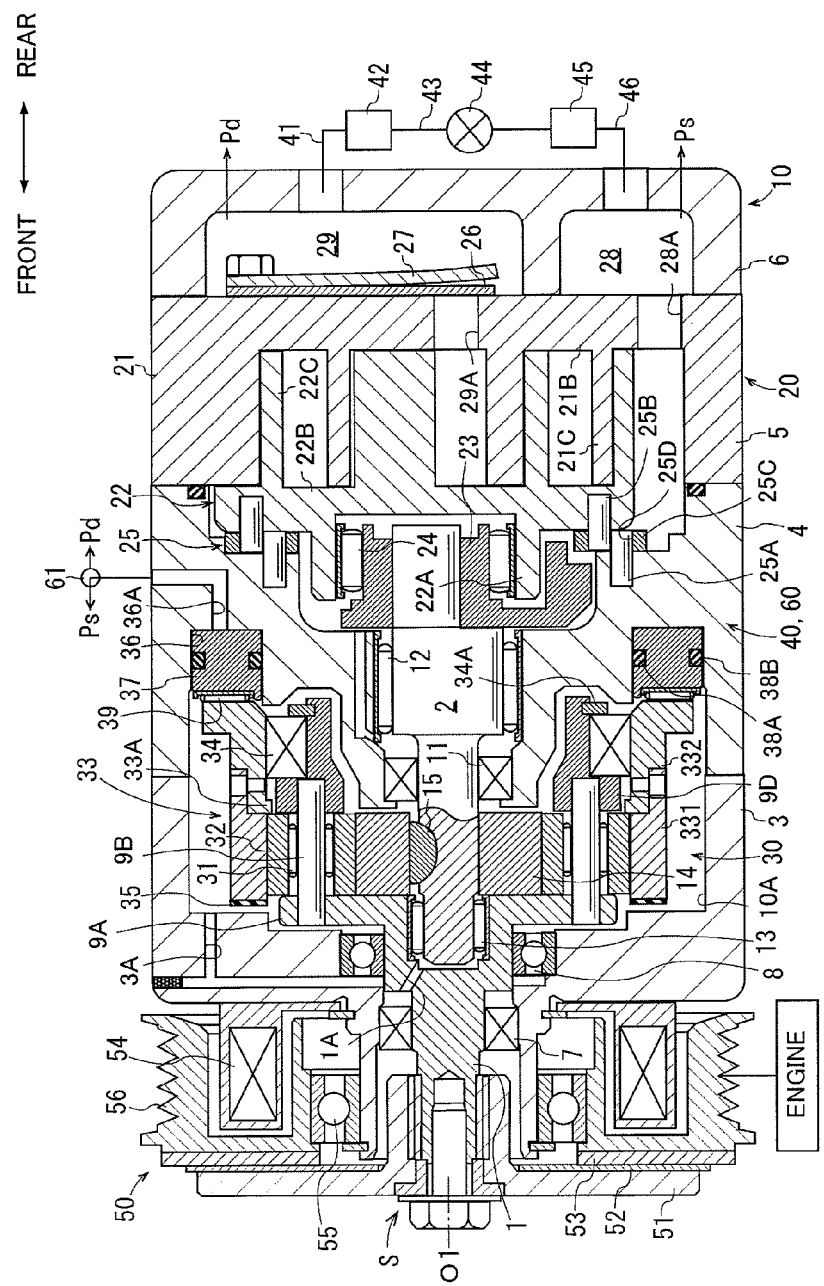
FIG. 1 is a longitudinal sectional view of a compressor with a transmission according to a first embodiment of the present invention.

As shown in FIG. 1, the compressor with the transmission (hereinafter referred to as compressor) according to the first embodiment includes a scroll-type compression mechanism 20, a transmission 30 and a control device 40 which are assembled together and is mounted on a vehicle as a part of an air conditioner. In each of the longitudinal views, the left-hand side and the right-hand side of the drawings correspond to the front and the rear of the compressor, respectively.

The compressor includes a housing 10 including a first housing 3, a second housing 4, a third housing 5 and a fourth housing 6 which are connected together in this order. Rear end surface of the first housing 3 and front end surface of the second housing 4 are connected thereby to form therein a transmission chamber 10A which is filled with traction oil. The first housing 3 has formed therethrough a passage 3A through which traction oil is introduced from outer peripheral region of the transmission chamber 10A to the center thereof.

The third housing 5 has a fixed scroll 21 integrally formed therewith. The second housing 4 and the third housing 5 cooperate to house therein a movable scroll 22. The fixed scroll 21 and the movable scroll 22 will be described later. The third housing 5 and the fourth housing 6 are connected each other thereby to form therebetween a suction chamber 28 and a discharge chamber 29.

An input shaft 1 is rotatable on an axis O1 thereof and supported by a boss of the first housing 3 through a seal member 7 and a bearing 8. The bearing 8 is pressed into the first housing 3 with a clearance formed between the bearing 8 and the input shaft 1. A key 15 is provided between an output shaft 2 and a sun roller 14 that forms a part of the transmission 30. The provision of the clearance and the key 15 allows an assembly S including the input shaft 1, a carrier 9, a radial bearing 31, a plurality of planetary rollers 32, the sun roller 14, a ring roller 33, a friction layer 35, a circlip 34A and a one-way clutch 34 to move as a unit in the direction that is parallel to the axis O1 relative to the first housing 3.

Rear end of the input shaft 1 extends rearward in the transmission chamber 10A and the input shaft 1 is formed integrally with a carrier body 9A in the form of a disc located adjacently to the rear end of the input shaft 1 and extending radially outward from the input shaft 1 in facing relation to the inner surface of the first housing 3 so as to have a clearance between the carrier body 9A and the inner surface of the first housing 3. The carrier body 9A forms a part of the transmission 30 as will be described later.

The output shaft 2 is rotatable on the axis O1 and supported by a boss of the second housing 4 through a seal member 11 and a radial bearing 12. Front end of the output shaft 2 is located within the carrier body 9A and a radial bearing 13 is provided between the carrier body 9A and the output shaft 2. A passage 1A is formed in the input shaft 1 for communicating with the passage 3A formed in the first housing 3 and supplying traction oil to the radial bearing 13. The sun roller 14 is mounted on the output shaft 2 at a position rearward of the carrier body 9A. The aforementioned key 15 is provided between the output shaft 2 and the sun roller 14 so that the sun roller 14 integrally rotates with the output shaft 2 and also that the sun roller 14 moves relative to the output shaft 2 in the direction parallel to the axis O1. The sun roller 14 also forms a part of the transmission 30. Rear end of the output shaft 2 extends toward the movable scroll 22.

The following will describe the compression mechanism 20. A drive bush 23 integrally formed with a balancer and the movable scroll 22 are housed between the second housing 4 and the third housing 5.

The drive bush 23 that is eccentrically fixed to the rear end of the output shaft 2 can rotate integrally with the output shaft 2. A radial bearing 24 is provided on outer peripheral surface of the drive bush 23.

The movable scroll 22 includes a boss 22A that is rotatably supported by the drive bush 23 through the radial bearing 24, a disc-shaped movable end plate 22B formed integrally with the boss 22A and extending radially and a movable scroll wall 22C extending rearward from the movable end plate 22B in the direction parallel to the axis O1.

Three or more fixed pins 25A of the rotation preventing device 25 are fixed to the rear surface of the second housing 4 in the direction parallel to the axis O1. Additionally, the same number of movable pins 25B as that of the fixed pins 25A are fixed to the movable end plate 22B of the movable scroll 22 in the direction parallel to the axis O1. Furthermore, the same number of movable rings 25C as that of the fixed pins 25A and the movable pins 25B are provided between the second housing 4 and the movable end plate 22B. The movable ring 25C has formed therethrough a hole 25D receiving therein a pair of the fixed pin 25A and the movable pin 25B with the axes thereof spaced away at a distance corresponding to the orbital radius of the movable scroll 22. The fixed pin 25A, the movable pin 25B and the movable ring 25C cooperate to form the aforementioned rotation preventing device 25 for preventing the movable scroll 22 from rotating on its axis.

As mentioned earlier, the fixed scroll 21 is integrally formed with the third housing 5. The fixed scroll 21 includes a disc-shaped fixed end plate 21B extending radially outward and a fixed scroll wall 21C extending frontward from the fixed end plate 21B in the direction parallel to the axis O1.

The fixed scroll wall 21C of the fixed scroll 21 and the movable scroll wall 22C of the movable scroll 22 have the same length as measured in the direction parallel to the axis O1. The distal ends of the fixed scroll wall 21C of the fixed scroll 21 and the movable scroll wall 22C of the movable scroll 22 are slidable on the movable end plate 22B and the fixed end plate 21B, respectively.

The fixed end plate 21B has formed therethrough at the center thereof a discharge port 29A that is communicable with a discharge chamber 29. A discharge valve 26 and a retainer 27 are fixed to the fixed end plate 21B in the discharge chamber 29 so as to close the discharge port 29A. The fixed end plate 21B has formed therethrough in the outer peripheral portion thereof a suction port 28A communicating with a suction chamber 28.

The above second, third and fourth housings 4, 5, 6, the output shaft 2, the drive bush 23, the movable scroll 22, the rotation preventing device 25 and the fixed scroll 21 cooperate to form the scroll-type compression mechanism 20.

The discharge chamber 29 is connected to a condenser 42 by a tube 41, the condenser 42 is connected to an evaporator 45 through an expansion valve 44 by a tube 43 and the evaporator 45 is connected to the suction chamber 28 by a tube 46. A discharge-pressure supply passage (or channel Pd-Pd shown in FIG. 1) is provided for supplying a discharge pressure Pd in the discharge chamber 29 to an electromagnetic valve 61. Similarly, a suction-pressure supply passage (or channel Ps-Ps shown in FIG. 1) is provided for supplying a suction pressure Ps in the suction chamber 28 to the electromagnetic valve 61. Though not shown in the drawing, a passage is provided in the second and the third housings 4, 5 for holding the pressure in the transmission chamber 10A at a level of the suction pressure Ps by connecting the suction chamber 28 and the transmission chamber 10A.

The following will describe the transmission 30. In the transmission chamber 10A, four support shafts 9B extend rearward from positions on an imaginary circle centered on the axis O1 on the rear surface of the carrier body 9A that are adjacent to the outer periphery of the carrier body 9A in parallel relation to the axis O1. Each support shaft 9B is cylindrically-shaped. Each of the aforementioned planetary rollers 32 is rotatably supported by the support shaft 9B through the radial bearing 31. Outer surface of the planetary roller 32 engages with outer surface of its corresponding sun roller 14 with interference therebetween. The outer surfaces of the respective planetary rollers 32 and the sun roller 14 are coated so as to prevent slip therebetween.

A rear carrier 9D is fixed to the rear end of each support shaft 9B. The rear carrier 9D is substantially cylindrically-shaped and extending rearward. The carrier body 9A, the respective support shaft 9B and the rear carrier 9D cooperate to rotatably support the four planetary rollers 32 and to form the carrier 9 that is integrally rotatable with the input shaft 1.

Figure 2:
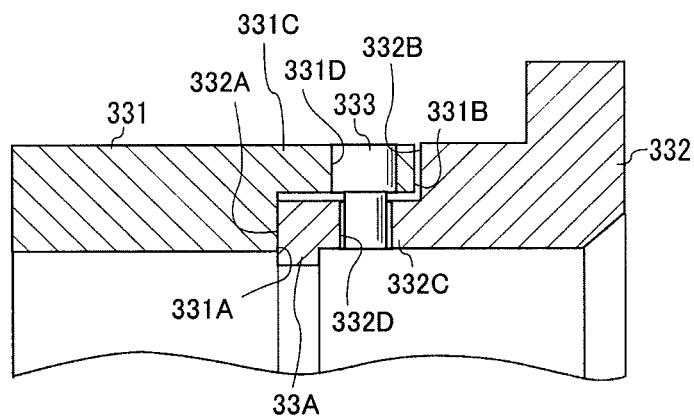
FIG. 2 is a fragmentary partially enlarged longitudinal sectional view of the compressor with the transmission of FIG. 1.

The aforementioned ring roller 33 is provided between the respective planetary roller 32 and the first and the second housings 3, 4 so as to be movable relative to the housing 10 in the direction parallel to the axis O1. As shown in FIG. 2, the ring roller 33 includes cylindrical first and second rings 331, 332.

Figure 3:
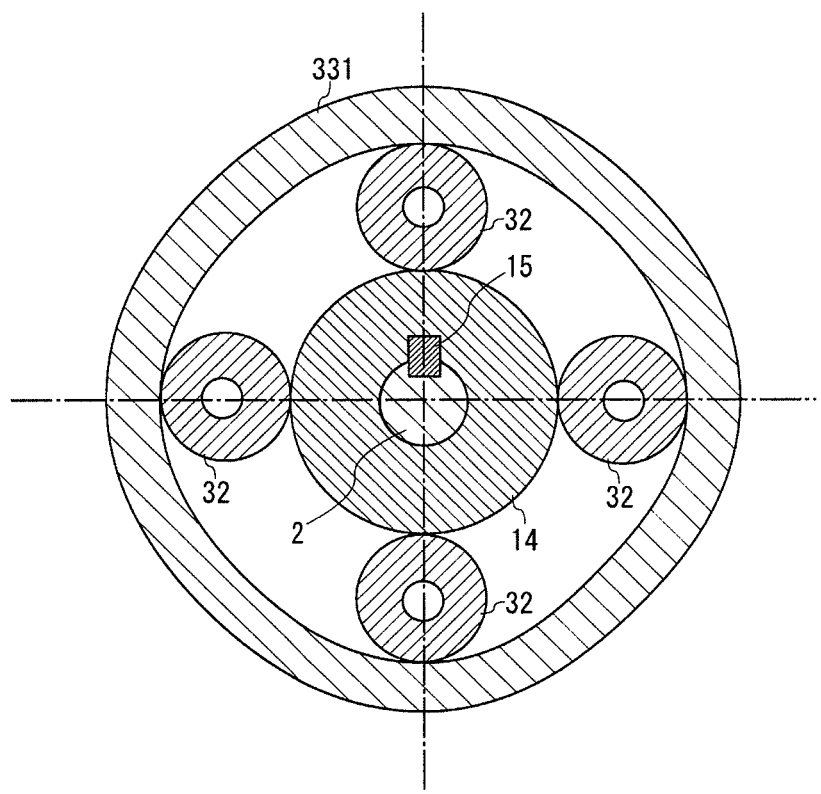
FIG. 3 is another fragmentary partially enlarged cross sectional view of the compressor with the transmission of FIG. 1.

The first ring 331 is made of a material having a relatively low stiffness so as to be displaceable in a radial direction as shown in FIG. 3. Therefore, the first ring 331 can be displaced in a radial direction by the interferences between the sun roller 14 and the respective planetary roller 32 and also between the respective planetary roller 32 and the ring roller 33. Inner surface of the first ring 331 is also coated so as to prevent a slip between the first ring 331 and the respective planetary rollers 32.

As shown in FIG. 2, the rear surface of the first ring 331 is stepped, having a first rear surface 331A located on radially inner side thereof and a second rear surface 331B located on radially outer side thereof. As shown in FIG. 2, the second rear surface 331B is located rearward of the first rear surface 331A so that the first ring 331 has an annular first step 331C. The first step 331C has formed radially therethrough a first ring hole 331D.

The second ring 332 is made of a material having a relatively high stiffness. Actually, the stiffness of the second ring 332 is higher than that of the first ring 331. As shown in FIG. 1, the outer peripheral surface of the one-way clutch 34 is in contact with the inner peripheral surface of the second ring 332.

As shown in FIG. 2, the front end of the second ring 332 is stepped, having a first front surface 332A located on radially inner side thereof and a second front surface 332B located on radially outer side thereof. The second ring 332 has a second step 332C with the first front surface 332A located frontward of the second front surface 332B. The second step 332C has formed therethrough in radial direction a second ring hole 332D. The second ring 332 has also formed at the front end thereof a flange 33A extending radially inward so as to be contactable with the rear end of the respective planetary rollers 32.

A shoulder pin 333 is inserted in the first ring hole 331D of the first ring 331 and the second ring hole 332D of the second ring 332. Specifically, the head of the shoulder pin 333 is press-fitted in the first ring hole 331D and the shaft of the shoulder pin 333 is loosely passed through the second ring hole 332D as shown in FIG. 2. With the shoulder pin 333 thus inserted in the first ring hole 331D and the second ring hole 332D as shown in FIG. 2, the first rear surface 331A of the first ring 331 contacts with the first front surface 332A of the second ring 332 and a clearance is formed between the second rear surface 331B of the first ring 331 and the second front surface 332B of the second ring 332. The first ring 331 and the second ring 332 are connected in this manner.

Thus, the second ring 332 supports the one-way clutch 34 and is rotatable integrally with the first ring 331 and movable with the first ring 331 in the direction parallel to the axis O1 without being influenced by the displacement of the first ring 331 in radial direction. Even if the first ring 331 is displaced in radial direction, the second ring 332 maintains high accuracy in dimensions and cylindricality and gives no influence on the function of the one-way clutch 34.

As shown in FIG. 1, the sun roller 14, the respective planetary rollers 32, the ring roller 33 and the carrier 9 cooperate to form the transmission 30 that is a planetary roller train.

The one-way clutch 34 that is a known clutch available on the market is fixed to the outer peripheral surface of the rear carrier 9D by the circlip 34A. The one-way clutch 34 allows the ring roller 33 to rotate only in one direction relative to the carrier 9. In the present embodiment, it is so arranged that the input shaft 1 and the carrier 9 rotate on the axis O1 in clockwise direction as viewed from the front of the compressor. The one-way clutch 34 allows the ring roller 33 to rotate only in counter-clockwise direction relative to the carrier 9 as viewed from the front of the compressor.

The friction layer 35 is provided on front surface of the ring roller 33 in facing relation to the rear surface of the first housing 3. The friction layer 35 is made of an annular flat plate having a low slide property. When the ring roller 33 moves frontward, the friction layer 35 contacts with the rear surface of the first housing 3.

A control chamber 36 is formed in the front surface of the second housing 4 in the shape of an annular recess in facing relation to the rear surface of the ring roller 33. An annular control piston 37 is accommodated in the control chamber 36 so as to slide in longitudinal direction of the compressor (or in the direction parallel to the axis O1). O-rings 38A, 38B made of rubber are provided in the inner and outer peripheral surfaces of the control piston 37 for sealing between the control piston 37 and the control chamber 36.

The electromagnetic valve 61 as a pressure adjusting device is connected to the control chamber 36 through a passage 36A. The electromagnetic valve 61 is operable to connect the control chamber 36 selectively to the discharge-pressure supply passage (channel Pd-Pd shown in FIG. 1) or to the suction-pressure supply passage (channel Ps-Ps shown in FIG. 1). As previously described, the pressure in the transmission chamber 10A facing the control piston 37 is maintained at the suction pressure Ps. A thrust bearing 39 is located at the front of the control piston 37 and rearward of the second ring 332.

The friction layer 35, the control chamber 36, the control piston 37, the passage 36A, the thrust bearing 39 and the electromagnetic valve 61 cooperate to form a clutch 60 that fixes the ring roller 33 to the first housing 3 or allows the ring roller 33 to rotate relative to the first housing 3. The clutch 60, the one-way clutch 34, the electromagnetic valve 61 and the passage 36A cooperate to form the control device 40.

An electromagnetic clutch 50 is connected to the front end of the input shaft 1. The electromagnetic clutch 50 includes a hub 51 that is fixed to the front end of the input shaft 1 for rotating with the input shaft 1, an armature 53 connected to the hub 51 through a leaf spring 52 and a coil 54 fixed to the front surface of the first housing 3. A pulley 56 is rotatably supported by a boss of the first housing 3 through a radial bearing 55. The pulley 56 is coupled to an engine as an external drive source through a belt. The coil 54 is provided inside the pulley 56.

When the coil 54 of the electromagnetic clutch 50 is energized, the armature 53 is attracted to the pulley 56 against elastic force of the leaf spring 52 and the input shaft 1 is integrally rotated with the pulley 56, so that the torque of the engine is transmitted to the input shaft 1. The rotation of the input shaft 1 around the axis O1 is transmitted at the same or increased speed to the output shaft 2.

On the other hand, when the coil 54 is deenergized, the armature 53 is separated from the pulley 56 by the elastic force of the leaf spring 52 and the torque transmission to the input shaft 1 is shut off. Thus, the drive force from the external engine is connected or disconnected by the electromagnetic clutch 50.

When the output shaft 2 is driven to rotate, the drive bush 23 whose axis is eccentric to the axis of the output shaft 2 is rotated and the movable scroll 22 make an orbital motion while being prevented from rotating around its axis by the rotation preventing device 25 in the compression mechanism 20. With the orbital motion of the movable scroll 22, a compression chamber that is formed between the fixed scroll 21 and the movable scroll 22 is progressively reduced in volume from outer side of the compression mechanism 20 to the center thereof. Thus, refrigerant drawn into the compression chamber from the suction chamber 28 is compressed and discharged into the discharge chamber 29. Refrigerant in the discharge chamber 29 is delivered to the condenser 42 and air-conditioning for a compartment of the vehicle is accomplished by allowing the refrigerant to be evaporated by the evaporator 45.

Meanwhile, when the discharge pressure Pd is applied to the control chamber 36 and the pressure in the control chamber 36 is increased higher than that in the transmission chamber 10A, the control piston 37 is moved frontward. Accordingly, the control piston 37 moves frontward the second ring 332, which moves frontward and urges the first ring 331 against the first housing 3. That is, the control piston 37 urges the aforementioned assembly S as a unit frontward through the ring roller 33. The ring roller 33 is pressed securely against the first housing 3 due to high friction between the friction layer 35 and the first housing 3.

Then, the one-way clutch 34 allows the ring roller 33 to rotate relative to the carrier 9 only in one direction (i.e. in counter-clockwise direction as viewed from the front of the compressor). In accordance with the rotation of the input shaft 1 and the carrier 9, the respective planetary rollers 32 that orbit around the axis O1 in clockwise direction rotate around their corresponding support shafts 9B in counter-clockwise direction due to the interference between the respective planetary rollers 32 and the first ring 331. As a result, the sun roller 14 engaged with the respective planetary rollers 32 and the output shaft 2 rotatable integrally with the sun roller 14 are rotated at a higher speed than that of the input shaft 1. Thus, the rotation of the input shaft 1 is transmitted at an increased speed to the output shaft 2.

On the other hand, when the suction pressure Ps is applied to the control chamber 36 and the pressure in the control chamber 36 becomes the same as that in the transmission chamber 10A, the control piston 37 no longer urges the ring roller 33 against the first housing 3. Since the control piston 37 no longer urges the assembly S frontward through the ring roller 33, the friction layer 35 and the first housing 3 are disengaged from each other and the friction force therebetween no longer works. Thus, the ring roller 33 can rotate relative to the first housing 3 and rolls by the thrust bearing 39.

In the compressor, the respective planetary rollers 32 move the second ring 332 in the direction parallel to the axis O1 easily via the flange 33A. The first ring 331 is also moved in the same direction easily. The ring roller 33 attempts to rotate with the input shaft 1 around the axis O1 in a clockwise direction. Since the respective planetary rollers 32 in contact with the sun roller 14 rotate around its axis in clockwise direction, the ring roller 33 attempts to rotate in clockwise direction faster than the input shaft 1. However, the one-way clutch 34 prevents the ring roller 33 from rotating relative to the carrier 9 in clockwise direction as viewed from the front of the compressor. The thrust bearing 39 prevents the ring roller 33 from dragging the control piston 37. Therefore, the input shaft 1, the carrier 9, the respective planetary rollers 32, the sun roller 14, the ring roller 33 and the output shaft 2 are rotatable integrally as a unit, and the rotation of the input shaft 1 is transmitted at the same speed to the output shaft 2.

Thus, the compressor that employs the transmission 30 made of the planetary roller train causes less vibration and less noise. Though the compressor can change the rotating speed of the input shaft 1 into two different speeds of the output shaft 2, it can be manufactured at a low cost due to the simplified structure.

Therefore, the compressor according to the present embodiment of the present invention can accomplish the reduction of manufacturing cost and noise development.

Figure 4:
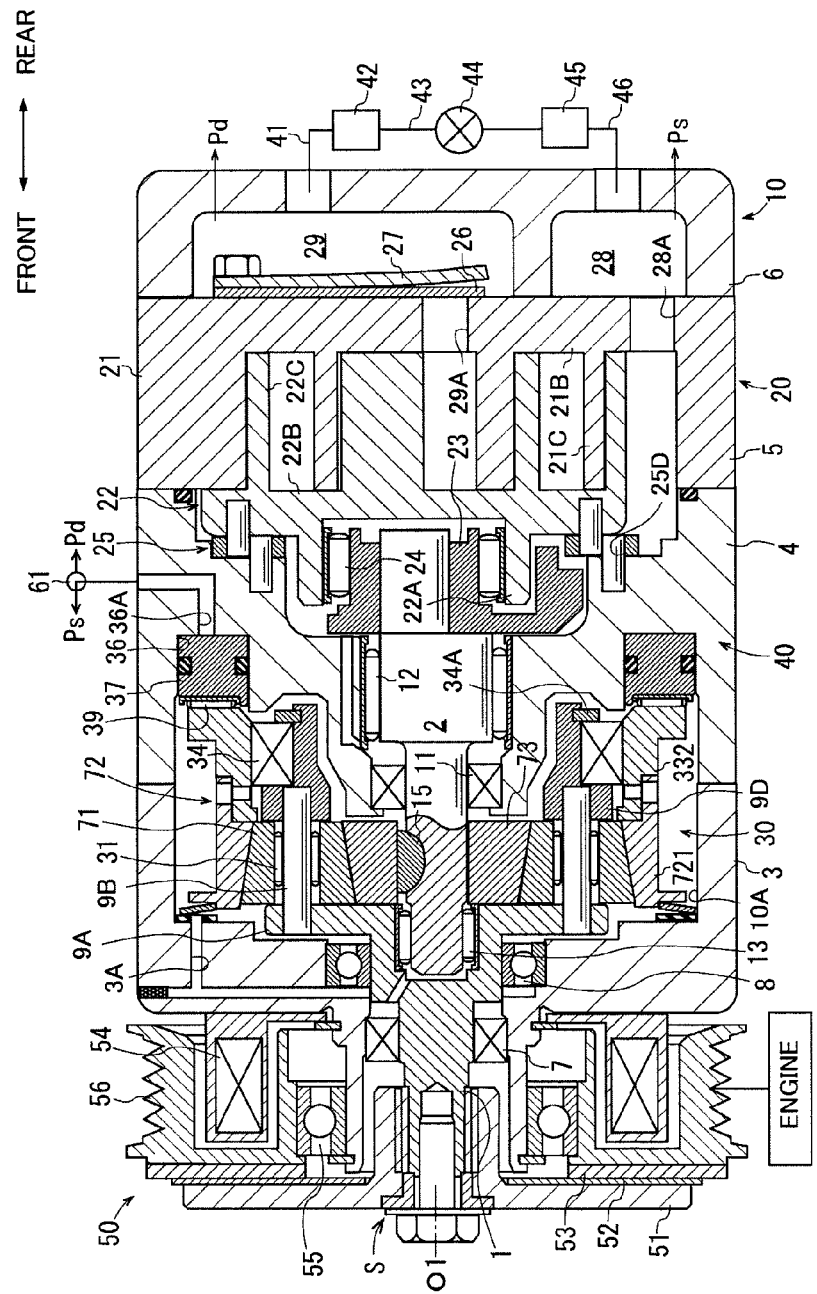
FIG. 4 is a longitudinal sectional view of a compressor with a transmission according to a second embodiment of the present invention.
Figure 5:
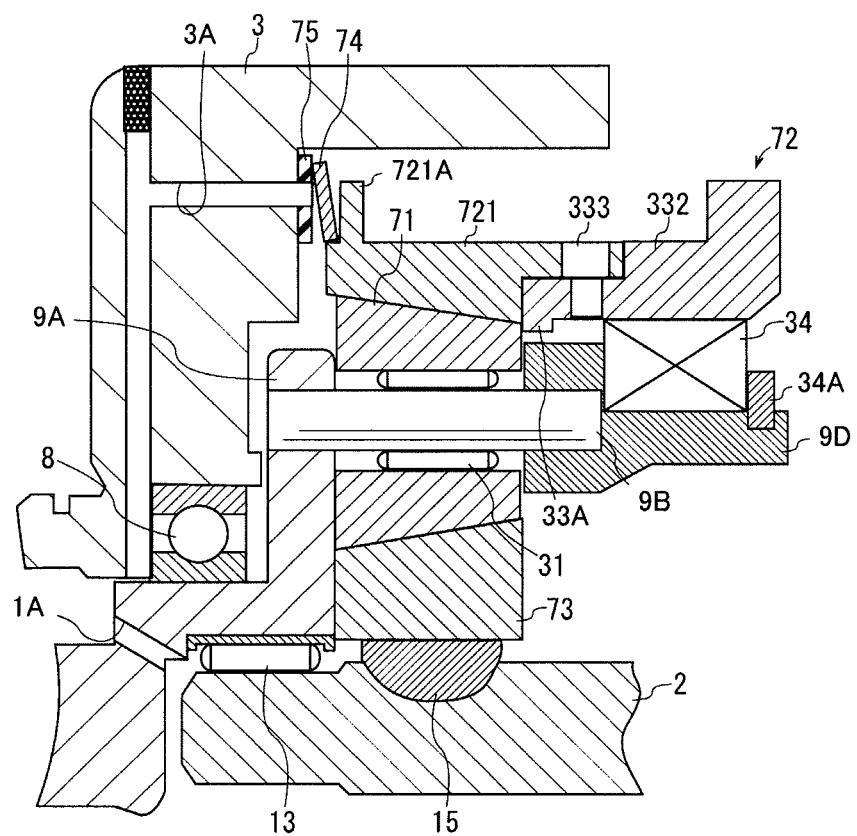
FIG. 5 is a fragmentary partially enlarged longitudinal sectional view of the compressor with the transmission of FIG. 4

The compressor according to the second embodiment shown in FIGS. 4 and 5 differs from the compressor according to the first embodiment in that a ring roller 72, a planetary roller 71 and a sun roller 73 are used in place of the ring roller 33, the planetary roller 32 and the sun roller 14, respectively, of the compressor according to the first embodiment. Specifically, the ring roller 72 includes a first ring 721, the second ring 332 and the shoulder pin 333. Inner surface of the first ring 721 is formed in a tapered shape rearwardly. Accordingly, the outer surfaces of respective planetary rollers 71 are formed in a tapered shape rearwardly. The outer surface of the sun roller 73 is formed in a tapered shape frontwardly.

The first ring 721 has formed on the front outer peripheral surface thereof a flange 721A extending radially outward, and a leaf spring 74 is provided between the first housing 3 and the flange 721A for urging the ring roller 72 rearward. The leaf spring 74 corresponds to the urging device of the present invention. A friction layer 75 is provided on the rear surface of the first housing 3 so as to face the leaf spring 74. The passage 3A formed in the first housing 3 extends through the friction layer 75. The following description will use the same reference numerals for the common elements in the first and the second embodiments, and the description of such elements or components will be omitted.

When the control piston 37 moves the second ring 332 frontward by the discharge pressure Pd, the interferences between the first ring 721 and the respective planetary rollers 71 and between the respective planetary rollers 71 and the sun roller 73 increase. In other words, when the rotating speed of the output shaft 2 is increased higher than that of the input shaft 1 and the torque transmitted is increased, the respective interferences increase.

On the other hand, when the second ring 332 is moved rearward, the interferences between the first ring 721 and the respective planetary rollers 71 and between the respective planetary rollers 71 and the sun roller 73 decrease, respectively. In other words, when the rotating speed of the output shaft 2 is the same as that of the input shaft 1 and the torque transmitted to the output shaft 2 is decreased, the respective interferences decrease.

The interference changes in accordance with the torque to be transmitted in the compressor according to the second embodiment and the power loss changes, accordingly. Thus, the compressor accomplishes reduction in power loss. Since the first ring 721 is urged by the high discharge pressure Pd, the torque can be transmitted steadily by the increased interference when the rotating speed of the output shaft 2 is higher than that of the input shaft 1.

The compressor according to the second embodiment wherein the leaf spring 74 helps to reduce power loss can accomplish the reduction in power loss during compressor operation other than when the rotating speed of the output shaft 2 is higher than that of the input shaft 1. The second embodiment offers the same advantageous effects as the first embodiment.

The present invention is not limited to the first and the second embodiments and the invention may be practiced in various manners within the scope of the invention.

The compression mechanism is not limited to a scroll-type mechanism but may employ a general type of compression mechanism such as piston type compression mechanism. The clutch may include a link mechanism composed of a plurality of movable members.

The present invention can be used for a vehicle air conditioner.

What is claimed is:

1. A compressor comprising:
   a housing;
   a compression mechanism formed in the housing and operable to compress refrigerant;
   an input shaft supported by the housing, the input shaft extending into the housing from outside and rotatable on an axis of the input shaft;
   an output shaft supported by the housing, the output shaft extending in the housing and rotatable on the axis for driving the compression mechanism;
   a transmission provided in the housing between the input shaft and the output shaft for transmitting torque from the input shaft to the output shaft and also changing the rotating speed of the input shaft into two different rotating speeds of the output shaft for driving the compression mechanism by at the same or increased rotating speed, the transmission including:
      a plurality of planetary rollers;
      a carrier rotatably supporting the respective planetary rollers and integrally rotatable with the input shaft;
      a sun roller engaged with the respective planetary rollers and integrally rotatable with the output shaft; and
      a ring roller engaged with the respective planetary rollers, the ring roller which can be fixed to the housing or rotatable relative to the housing; and
   a control device provided between the carrier and the ring roller for controlling the operation of the transmission, the control device including:
      a one-way clutch provided between the ring roller and the carrier and allowing the ring roller to rotate only one direction relative to the carrier; and
      a clutch provided between the housing and the ring roller, the clutch fixing the ring roller to the housing or allowing the ring roller to rotate relative to the housing, wherein the ring roller including:
         a first ring engaged with the respective planetary rollers; and
         a second ring supporting the one-way clutch, wherein the ring roller can be movable relative to the housing in the direction parallel to the axis, wherein the first ring and the second ring are connected so that the first ring can be displaced in a radial direction, integrally rotatable with the second ring and movable with the second ring in the direction parallel to the axis.

2. The compressor according to claim 1, wherein the stiffness of the second ring is higher than that of the first ring.

3. The compressor according to claim 1, wherein the first ring including:
   a first rear surface located on radially inner side of the first ring;
   a second rear surface located on radially outer side of the first ring;
   a first step formed so that the second rear surface is located rearward of the first rear surface; and
   a first ring hole formed radially through the first step, wherein the second ring including:
   a first front surface located on radially inner side of the second ring;
   a second front surface located on radially outer side of the second ring;
   a second step formed so that the first front surface is located frontward of the second front surface;
   a second ring hole formed radially through the second step; and
   a flange that is formed at front end of the second ring extending radially inward so as to be contactable with rear end of the respective planetary rollers, wherein the ring roller further including a shoulder pin whose head is press-fitted in the first ring hole and whose shaft is loosely passed through the second ring hole, wherein the first rear surface of the first ring contacts with the first front surface of the second ring and a clearance is formed between the second rear surface of the first ring and the second front surface of the second ring.

4. The compressor according to claim 1, further comprising:
   a key provided between the output shaft and the sun roller so that the sun roller integrally rotates with the output shaft and moves relative to the output shaft in the direction parallel to the axis; and
   a bearing provided in the housing for rotatably supporting the input shaft with a clearance formed between the bearing and the input shaft.

5. The compressor according to claim 1, wherein the clutch provided between the housing and the first ring including:
   a friction layer that can fix the ring roller to the housing or release the ring roller relative to the housing by the movement of the second ring;
   a control chamber formed in the housing in facing relation to the second ring;
   a control piston accommodated in the control chamber so as to slide in the direction parallel to the axis;
   a thrust bearing provided between the control piston and the second ring; and
   a pressure adjusting device that moves the control piston by applying a pressure to the control chamber.

6. The compressor according to claim 5, wherein the pressure adjusting device is operable to connect the control chamber selectively to a discharge pressure or to a suction pressure, wherein a pressure in a transmission chamber accommodating the transmission is held at a level of the suction pressure.

7. The compressor according to claim 1, wherein inner surface of first ring and outer surfaces of respective planetary rollers are formed in a tapered shape rearwardly and outer surface of sun roller is formed in a tapered shape frontwardly so that the interferences between the first ring and the respective planetary rollers and between the respective planetary rollers and the sun roller increase when the second ring moves frontward for fixing the first ring to the housing and so that the interferences between the first ring and the respective planetary rollers and between the respective planetary rollers and the sun roller decrease when the second ring moves rearward for releasing the first ring relative to the housing.

8. The compressor according to claim 7, further comprising:
   an urging device provided between the housing and the first ring for urging the first ring rearward so that the interferences decrease.

* * * * *